UNITED STATES PATENT OFFICE.

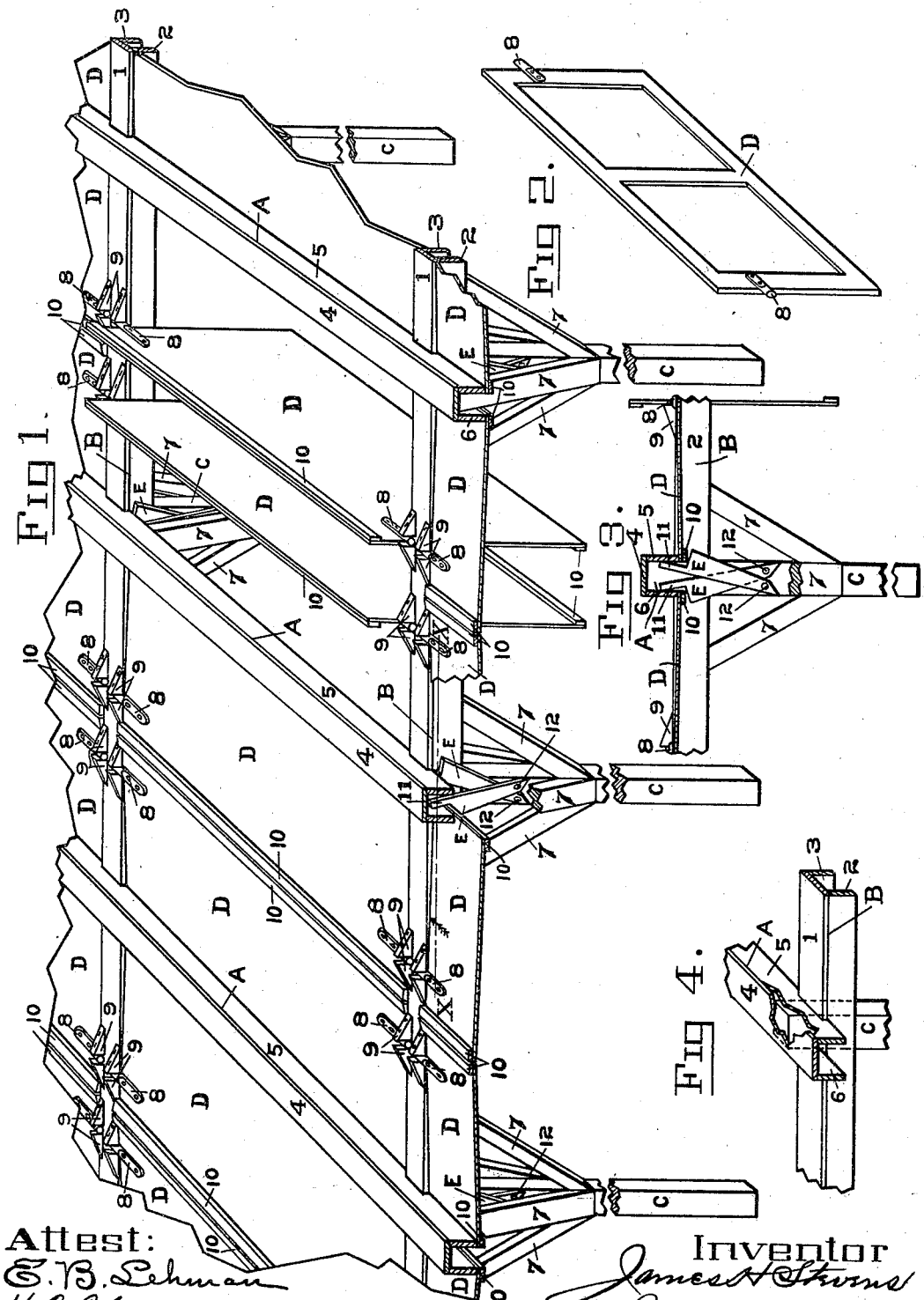

JAMES H. STEVENS, OF DAYTON, OHIO.

FROST-PROTECTOR.

SPECIFICATION forming part of Letters Patent No. 628,997, dated July 18, 1899.

Application filed May 4, 1899. Serial No. 715,816. (No model.)

*To all whom it may concern:*

Be it known that I, JAMES H. STEVENS, a citizen of the United States, residing at Dayton, in the county of Montgomery and State of Ohio, have invented certain new and useful Improvements in Frost-Protectors; and I do hereby declare that the following is a full, clear, and exact description of the invention.

This invention relates to frost-protectors, and more particularly to that class devised more especially to prevent the destruction of orange crops by frost. It is, however, equally valuable for the preservation of other fruits and vegetables.

The occasional visitation by severe frosts in parts of the country where oranges are raised and the destruction of crops and in some instances entire orange-groves thereby has made the business of orange and other tropical fruit growing extremely hazardous and has compelled persons engaged in such business to abandon it for the want of practical and efficient means of protecting their trees and crops against destruction by frost and cold. To supply this want, I have devised means whereby crops of various kinds can be shielded from and exposed to the elements at will and in a very simple and expeditious manner.

The primary feature of my invention consists in a roof or a series of roofs supported on posts and arranged as doors or shutters which can be readily closed on the approach of a cold change and equally readily opened when the danger is past. The shutters are so arranged that when open the crop below them is amply exposed to the elements, and as orange-trees naturally thrive best in semi-shade my invention is also useful in regulating the amount of shade, whereby the ripening of fruit can be hastened or retarded by their manipulation. The shutters are preferably arranged with their axis running north and south in order that the shade may be equally distributed during the morning and afternoon hours, when the shutters stand open, as they are intended to do most of the time, and by their peculiar mountings being hung off their centers they yield to the wind without exerting harmful stress on the supporting structure and can be easily removed and stored away when desired.

My invention further consists in certain novel features, which I will hereinafter describe and then particularly point out in the claims at the end of this specification.

In the accompanying drawings, Figure 1 is a perspective view of a structure embodying my invention; Fig. 2, a perspective view of a modified form of shutter removed from the supporting structure; Fig. 3, a sectional view taken on the line $x\ x$ of Fig. 1; and Fig. 4, a broken perspective view of the structure at the intersection of the posts and framework, drawn to a larger scale than the other figures.

Similar letters and numerals of reference indicate corresponding parts throughout the drawings.

In carrying out my invention I erect an open frame, (represented in the accompanying drawings by the letters A B.) This frame is carried by posts C and may be elevated to suit the crops to be raised beneath it. The structure is divided into compartments of convenient size, as shown in Fig. 1, and I prefer to construct the frame-timbers A B of boards 1, 2, 3, 4, 5, and 6, joined together to form hollow girders, as shown, such construction being stiffer and lighter than solid timbers of equal size. One of the posts C is provided at each intersection of the frame and extends past the girder B to the under side of the board 4 of girder A, the boards 2 3 and 5 6 of both girders overlapping the posts one above the other, as more clearly shown in Fig. 4. The structure is stiffened by a series of braces 7, which may be arranged in any convenient manner and at each intersection or otherwise, as desired.

In each of the open spaces of the frame there are mounted a pair of shutters or doors D, which are hung on pivots 8, having bearings in sockets 9, secured to the girders B. These pivots are secured to the shutters to one side of the horizontal center line thereof, thus throwing the shutter out of balance and allowing it to assume a vertical position when open. The sockets in which the pivots rotate are preferably open at the top in order to allow the shutters to be placed in position and removed quickly. The shutters may be made of any suitable material and form, and they should be of proper size to practically close the space in which they are hung. In Fig. 2 I have shown a modified form of shutter consisting of a frame which may be covered with canvas or other material. I prefer, however, to construct the shutters of thin boards secured to battens 10, as shown in Fig. 1, and to hang them eccentrically, as described. The shutters are held closed by means of gravity-latches E, having a portion 11, which extends upwardly into the hollow girder A and acts as a stop to control the movement of the latch, which is pivoted at 12 to the post C in such manner as to cause the latch always to assume a position to engage the shutter automatically as the latter is closed and to hold it in a closed position until released by freeing the latch from engagement therewith. These gravity-latches may be sawed out of scrap pieces of lumber or they may be cast of metal, and I prefer to employ one of them at each end of each shutter. It will be observed that when the shutter is closed its lower edge is held between the gravity-latch E and the under side of girder A and that by releasing the latch the shutter will drop to the open position. (Shown in the right-hand section in Fig. 1.)

It is obvious that the structure hereinbefore described can be extended in all directions to cover any number of acres of ground and that it may be inclosed by outer walls, if desired.

Heretofore in times of danger of frost or freezing it has been customary to burn rosin or other fuel throughout orange-groves to protect the trees and fruit from destruction, and the benefits of such practice will be greatly increased by my present invention, the structural details of which may be departed from in various ways without departing from the spirit thereof.

Having thus fully described my invention, I claim—

1. A frost-protector adapted to the preservation of fruit and vegetable crops, consisting of an elevated frame divided into sections and forming a series of open spaces, in combination with eccentrically-hung shutters adapted to close said spaces, supporting-posts upon which said frame is carried, and gravity-latches adapted to automatically engage the shutters as the latter are closed and to hold the same in a closed position, thereby forming a roof over the crop to be protected, substantially as set forth.

2. A frost-protector adapted to the preservation of fruit and vegetable crops, consisting of an elevated frame divided into sections and forming a series of open spaces, in combination with removable eccentrically-hung shutters adapted to close said spaces, supporting-posts upon which the frame is carried, and gravity-latches adapted to automatically engage the shutters as the latter are closed and to hold the same in a closed position, thereby forming a roof over the crop to be protected, substantially as set forth.

3. In a frost-protector adapted to the preservation of fruit and vegetable crops, the combination of an elevated frame consisting of the girders A and B forming open spaces, the shutters D carried by the girders B and in pivotal connection therewith, the posts C supporting said frame and the gravity-latches E in pivotal connection with the posts and adapted to automatically engage the shutters and to hold the same in a closed position, substantially as set forth.

4. In a frost-protector adapted to the preservation of fruit and vegetable crops, the combination of an elevated frame consisting of the hollow girders A and B forming open spaces, the shutters D having the eccentrically-arranged pivots 8, the open sockets 9 secured to the girders B and in which the said shutters are hung, the posts C supporting said frame, and the gravity-latches E in pivotal connection with the posts C and having the stop portions 11 extending into the hollow girder A, all adapted to operate as described and for the purpose set forth.

In testimony whereof I affix my signature, in presence of two witnesses, this 29th day of April, A. D. 1899.

JAMES H. STEVENS.

Witnesses:
EDWARD R. KIRBY,
N. EMMONS, Jr.